United States Patent
Cermak et al.

(10) Patent No.: US 7,824,272 B2
(45) Date of Patent: Nov. 2, 2010

(54) WHEEL HUB/JOINT UNIT

(75) Inventors: Herbert Cermak, Bessenbach (DE); Alfred Springer, Marburg (DE); Ernst Masur, Untereuerheim (DE); Peter Niebling, Bad Kissingen (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 573 days.

(21) Appl. No.: 11/667,621

(22) PCT Filed: Oct. 14, 2005

(86) PCT No.: PCT/EP2005/011059

§ 371 (c)(1),
(2), (4) Date: Nov. 2, 2007

(87) PCT Pub. No.: WO2006/050785

PCT Pub. Date: May 18, 2006

(65) Prior Publication Data

US 2008/0242433 A1    Oct. 2, 2008

(30) Foreign Application Priority Data

Nov. 12, 2004   (DE) .................. 10 2004 054 907

(51) Int. Cl.
*F16C 1/28* (2006.01)
(52) U.S. Cl. .................. 464/178; 464/906
(58) Field of Classification Search .......... 464/178, 464/906; 384/544, 589; 301/105.1
See application file for complete search history.

(56) References Cited

U.S. PATENT DOCUMENTS

| | | | |
|---|---|---|---|
| 4,804,233 A * | 2/1989 | Hofmann et al. | ........ 384/544 X |
| 5,052,979 A | 10/1991 | Welschof et al. | |
| 6,280,336 B1 | 8/2001 | Sone et al. | |
| 6,488,589 B2 | 12/2002 | Ouchi et al. | |

FOREIGN PATENT DOCUMENTS

| DE | 203 20 496 U1 | 10/2004 |
|---|---|---|
| DE | 103 38 172 B3 | 6/2005 |

* cited by examiner

*Primary Examiner*—Greg Binda
(74) *Attorney, Agent, or Firm*—Rader, Fishman & Grauer, PLLC

(57) ABSTRACT

A wheel hub/constant velocity joint unit wherein a wheel hub (60, 90) with a through-aperture (59, 89) carrying inner shaft teeth (44, 74) is clamped to an outer joint part (46, 76) of a constant velocity fixed joint (42, 72), which outer joint part (46, 76) comprises a formed-on journal (53, 83) with outer shaft teeth (54, 84), wherein the inner shaft teeth (44, 74) of the through-aperture (59, 89) and the outer shaft teeth (54, 84) of the journal (53, 83) engage one another and wherein a double-row wheel bearing (43, 73) is slid on to the wheel hub (60, 90) which comprises an inner bearing race (64, 94) which directly supports an end face (52, 82) of the outer joint part (46, 76), wherein half the sum of the pitch circle diameter of the joint balls PCD and the bearing width $B_L$ is greater than the center-to-center distance $A_{GL}$ between the constant velocity universal joint (42, 72) and the wheel bearing (43, 73).

14 Claims, 6 Drawing Sheets

WHEEL HUB/JOINT UNIT

TECHNICAL FIELD

The invention relates to a wheel hub/constant velocity joint unit wherein a wheel hub with a through-aperture carrying inner shaft teeth is clamped to an outer joint part of a constant velocity fixed joint, which outer joint part comprises a formed-on journal with outer shaft teeth, wherein the inner shaft teeth of the through-aperture and the outer shaft teeth of the journal engage one another and wherein a double-row wheel bearing is slid on to the wheel hub which comprises an inner bearing race which directly supports an end face of the outer joint part. A bolt which supports itself on the outside of the wheel hub and which is threaded into a threaded hole in the journal serves for clamping purposes.

BACKGROUND

Assemblies of this type are used at driven, more particularly steered wheels of motor vehicles, with the wheel and optionally a brake disc being threaded to the flange of the wheel hub, whereas the constant velocity universal joint forms an integral part of a driveshaft (sideshaft) which consists of an intermediate shaft, an inner plunging joint and the constant velocity universal joint mentioned here which can be provided in the form of a constant velocity fixed joint (front wheel drive) or also as a plunging joint (rear wheel drive). The bearing assembly has to be inserted into a wheel carrier or steering knuckle.

In prior art assemblies, the object is to dimension the wheel bearing in such a way that it is as small as possible, both for reasons of costs with reference to the wheel bearing and also with reference to the size of the wheel carrier and the steering knuckle. In view of the above considerations, the journal diameter at the outer joint part is calculated to ensure the required minimum strength, with the journal diameter at the same time determining the inner diameter of the wheel hub and thus indirectly, via the strength-related wall thickness of the hub, the inner diameter of the wheel bearing. In the case of torque changes, more particularly torque thrusts, which pass through the assembly, the elasticity of the journal designed in this way causes relative movements between the outer joint part and the inner bearing race of the wheel at the alternating abutment faces. This leads to the development of noise and also frictional corrosion.

SUMMARY OF THE INVENTION

The object of the present invention provides a new concept for a unit of said type which ensures a higher stiffness and shorter length and which avoids the above-mentioned disadvantages. In accordance with the present invention, a first solution provides a substantially reduced center-to-center distance between the joint and bearing as compared to existing sizes of the bearing width and joint diameter. According to the present invention, further solutions refer to a qualitative change in the dimensions of the journal which, accordingly, is very much shorter and thicker. At the same time, this results in a change in the inner diameter of the wheel hub and thus, indirectly, in the inner diameter and the pitch circle diameter of the wheel bearing. Advantageous effects are a substantial increase in the tilting stiffness of the bearing and an increase in the load bearing capacity of the bearing and thus in the service life.

The above-mentioned relative movements between the outer joint part and the inner bearing race are avoided and or substantially reduced, which is due, on the one hand, to the greater cross-section of the journal and thus to its higher torsional strength and, on the other hand, to the greater effective radius of the effective face of the reciprocal support between the outer joint part and the now larger inner bearing race.

The qualitative change in dimensions can be defined by various characteristic size ratios which qualitatively differ from previously used size ratios.

According to a first solution, half the sum of the pitch circle diameter PCD and of the joint balls in the constant velocity universal joint and the bearing width $B_L$ is greater than the center-to-center distance $A_{GL}$ between the joint center $M_G$ of the constant velocity universal joint, with the joint in the aligned condition, and the geometric center $M_L$ of the wheel bearing. Further embodiments will be listed below.

According to a first embodiment, the ratio of the bearing width $B_L$ and the journal diameter at the bearing base $D_Z$ is smaller than 1, i.e. $B_L/D_Z<1$.

In a further embodiment, the ratio of the journal length $L_Z$ and the pitch circle diameter of the bearing balls TKD is optionally smaller than 0.5, i.e. $L_Z/TKD <0.5$.

According to a further embodiment, the ratio of the used teeth length $L_{VERZ}$ and the pitch circle diameter of the bearing balls TKD is smaller than 0.25, i.e. $L_{VERZ}/TKD<0.25$.

In addition, according to a further embodiment, the ratio of the pitch circle diameter of the bearing balls and the bearing width is greater than 1.9, i.e. $TKD/B_L>1.9$.

Finally, a further embodiment is characterised in that the ratio of the cross-sectional area $A_E$ of the wheel hub in the region of a separate inner bearing race and the square of the elongation length $L_{DEHN}$ of a bolt for connecting the wheel hub and outer joint part is greater than 0.2, i.e. $A_E/L_{DEHN}^2>0.2$. This characteristic parameter indicates the stiffness in the tensioned volume of the wheel hub with the cross-section $A_E$.

According to a second embodiment of the solution, the ratio of the center-to-center distance $A_{GL}$ between the constant velocity fixed joint and the wheel bearing on the one hand and the journal diameter at the journal base $D_Z$ on the other hand is smaller than 2, i.e. $A_{GL}/D_Z<2$. More particularly, the ratio of the center-to-center distance between the constant velocity fixed joint and the wheel bearing in the one hand and the journal diameter at the journal basis $D_Z$ on the other hand is smaller than 1.5, i.e. $A_{GL}/D_Z<1.5$, more particularly smaller than 1.2, i.e. $A_{GL}/D_Z<1.2$. This results in a journal which is particularly rotationally stiff in order to minimise the relative movements between the inner bearing race and the joint abutment face.

A third solution provides that the ratio of the pitch circle diameter of the wheel bearing TKD and the journal length $L_Z$ is greater than 2, i.e. $TKD/L_Z>2$. In this context it is preferred that the ratio of the pitch circle diameter of the wheel bearing TKD and the journal length $L_Z$ is greater than 2.25, i.e. $TKD/L_Z>2.25$, more particularly greater than 2.85, i.e. $TKD/L_Z>2.85$. In this way, the rotational stiffness of the journal is paired with a tilting stiffness of the wheel bearing in order to minimize in operation the development of noise resulting from the relative movements between the inner bearing race and the joint abutment face, and also to minimize the influence of deformation, more particularly of the wheel hub.

Finally, according to a further solution, the ratio of the center-to-center distance $A_{GL}$ between the constant velocity universal joint and the wheel bearing on the one hand and the journal length $L_Z$ on the other hand is greater than 1.95, i.e. $A_{GL}/L_Z>1.95$; more particularly, the ratio should be greater than 2.0, i.e. $A_{GL}/L_Z>2.0$.

All the above-mentioned definitions depart from prior art size ratios of units of said type and there is ensured a unit whose characteristics increased to improved values. This is also obvious from the characteristic factor $D_Z^4$ of the resistance moments, which increases to a value in excess of $2\times10^6$ mm$^4$ and the characteristic factor $D_Z^4/L_Z$ of the resistance moments referring to the journal length, which increases to a value in excess of $10^6$ mm$^3$.

Said solutions in accordance with the invention can also be advantageously used by combining several or all the equations with one another.

According to another embodiment which applies to all the above-mentioned solutions, the wheel bearing only comprises one separate inner bearing race. According to a further advantageous embodiment, at the axially opposite end to the inner shaft teeth, the wheel hub comprises a reduced diameter of the through-aperture in order to further increase the strength of the hub. Furthermore, it is proposed that the journal comprises a central threaded bore into which there is threaded a bolt for clamping the wheel hub to the outer joint part. Finally, according to an advantageous embodiment, in the region of the reduced diameter, the bolt head is supported on a supporting face of the wheel hub.

As already mentioned, all the above-mentioned solutions permit the joint to be provided in the form of a fixed joint, with the centre of the joint $M_G$ being defined axially by the plane extending through the ball centers when the joint is in the aligned condition. Alternatively, all solutions permit the joint to be provided in the form of a plunging joint, with the center of the joint $M_G$ being defined axially by the plane extending through the ball centers, with the joint being in the aligned condition and set to the center of the axial plunging path $V_S$.

BRIEF DESCRIPTION OF THE DRAWINGS

A preferred embodiment of an inventive wheel hub/joint unit is illustrated in the drawings in a comparison with a unit according to the state of the art.

DETAILED DESCRIPTION OF THE DRAWINGS

Figure 1:
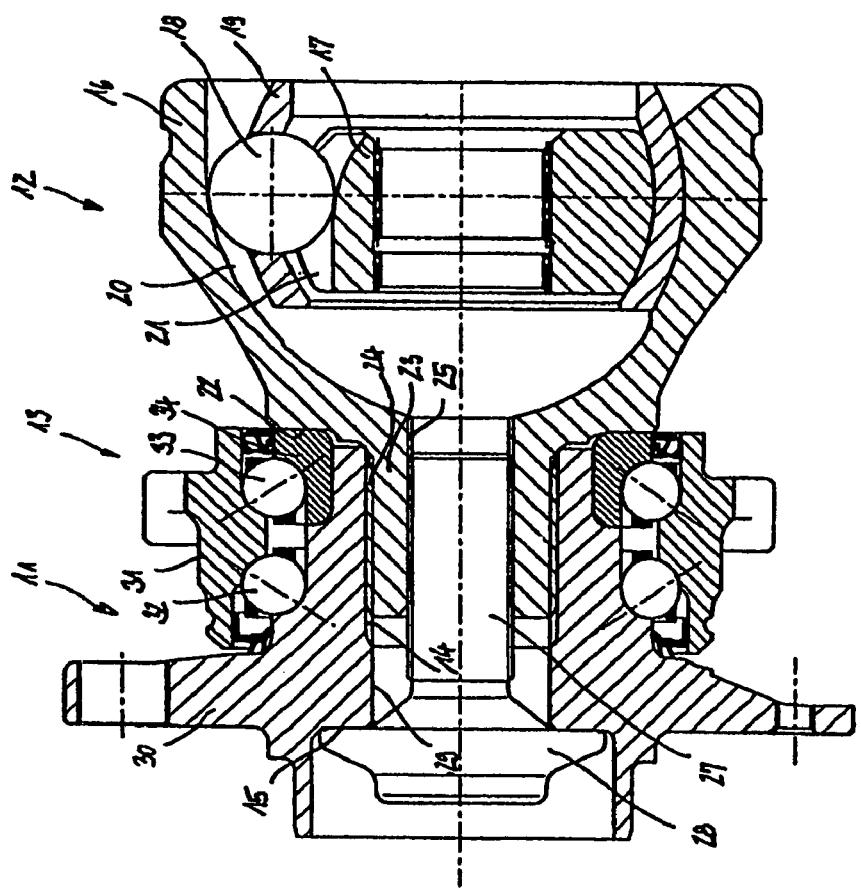
FIG. 1 shows a unit according to the state of the art in a longitudinal section, giving general reference numbers.
Figure 2:
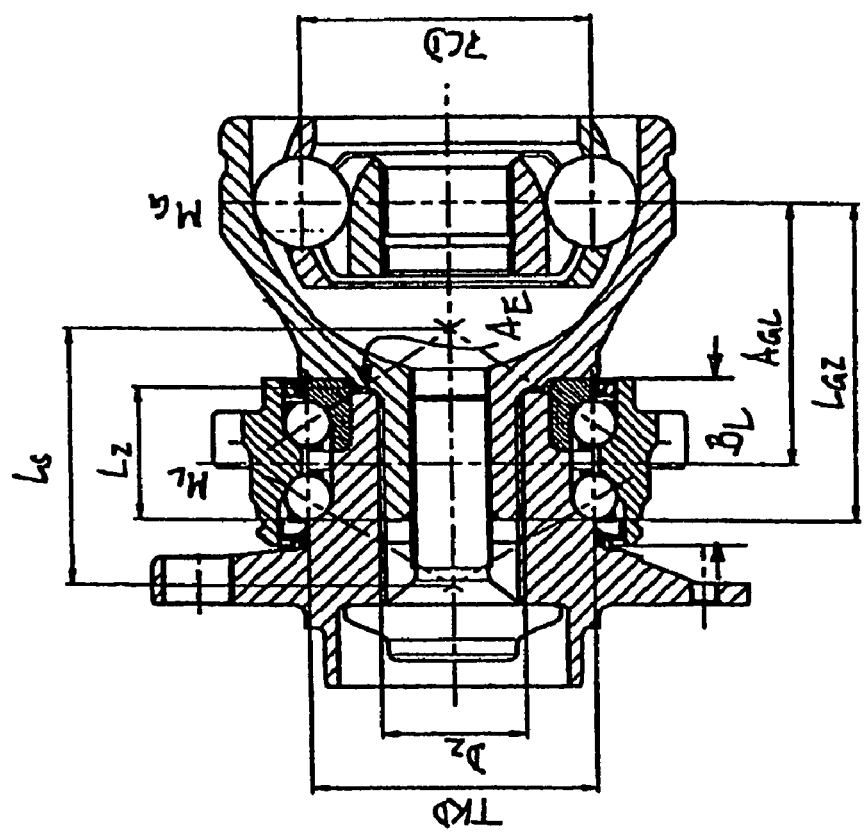
FIG. 2 shows a unit according to FIG. 1, giving characteristic parameters.

FIGS. 1 and 2 each show a wheel hub unit 11 for a driving wheel of a motor vehicle, having a constant velocity fixed joint 12 for being connected to a driveshaft. The wheel hub unit 11 comprises a bearing unit 13 and a wheel hub 30, with the bearing unit 13 being slipped on to the wheel hub 30 and being axially clamped in between the wheel hub 30 and the constant velocity fixed joint 12. The wheel hub 30 comprises a flange for threading on a wheel to which a brake disc can be threaded as well. Furthermore, the wheel hub 30 comprises a through-aperture 29 into which there are formed inner shaft teeth 14 from the joint end. At the flange, there is formed a central, substantially radial supporting face 15. The constant velocity fixed joint 12 is provided in the form of a UF joint (undercut free joint) and comprises an outer joint part 16, an inner joint part 17, torque transmitting balls 18 as well as a ball cage 19. The balls are held and guided in pairs of outer ball tracks 20 in the outer joint part and inner ball tracks 21 in the inner joint part. At the outer joint part 16, at the wheel hub end, there is formed a substantially radial supporting face 22. Furthermore, a central journal 23 is attached to the outer joint part and carries outer shaft teeth 24 which engage inner shaft teeth 14 of the hub. Furthermore, the journal is provided with a continuous central threaded bore 25 into which there is threaded a bolt 27 which, via a bolt head 28, is supported on the radial supporting face 15 of the flange 12. The double-row bearing 13 comprises an outer bearing race 31 which can be inserted into a wheel carrier and forms outer bearing grooves (no reference numbers) for the two rows of bearing balls 32, 33. A first inner bearing groove for the ball row 32 is provided directly in the wheel hub 30, whereas a second ball groove for the second ball row 33 is provided in a separate inner bearing race 34. The inner bearing race 34 axially projects beyond the wheel hub 30, so that the bearing assembly 13, under the influence of the supporting face 22 at the outer joint part, can be pretensioned by the bolt 27 supported on the supporting face 15. The assembly according to FIGS. 1 and 2 is designed to comprise a minimum pitch circle diameter TKD of the wheel bearing, with the journal 23 being provided with a minimum strength and, with a relatively small journal diameter $D_Z$, comprising a long journal length $L_Z$. As a result, the distance between the design bearing center $M_L$ and the design joint center $M_G$ increases, with said distance being referred to as $A_{GL}$. The same applies to the shown distance between the joint center and the journal end which is referred to as $L_{GZ}$ and approximately corresponds to $A_{GL}+L_Z/2$. A further characteristic parameter is shown in FIG. 2 in the form of the pitch circle diameter PCD of the joint. In addition, there is shown the supporting length $L_S$ of the bearing which comprises a so-called O-configuration, with the effective lines of the balls being positioned on symmetric conical faces which open relative to one another, as well as the bearing width $B_L$ of the bearing.

Figure 3:
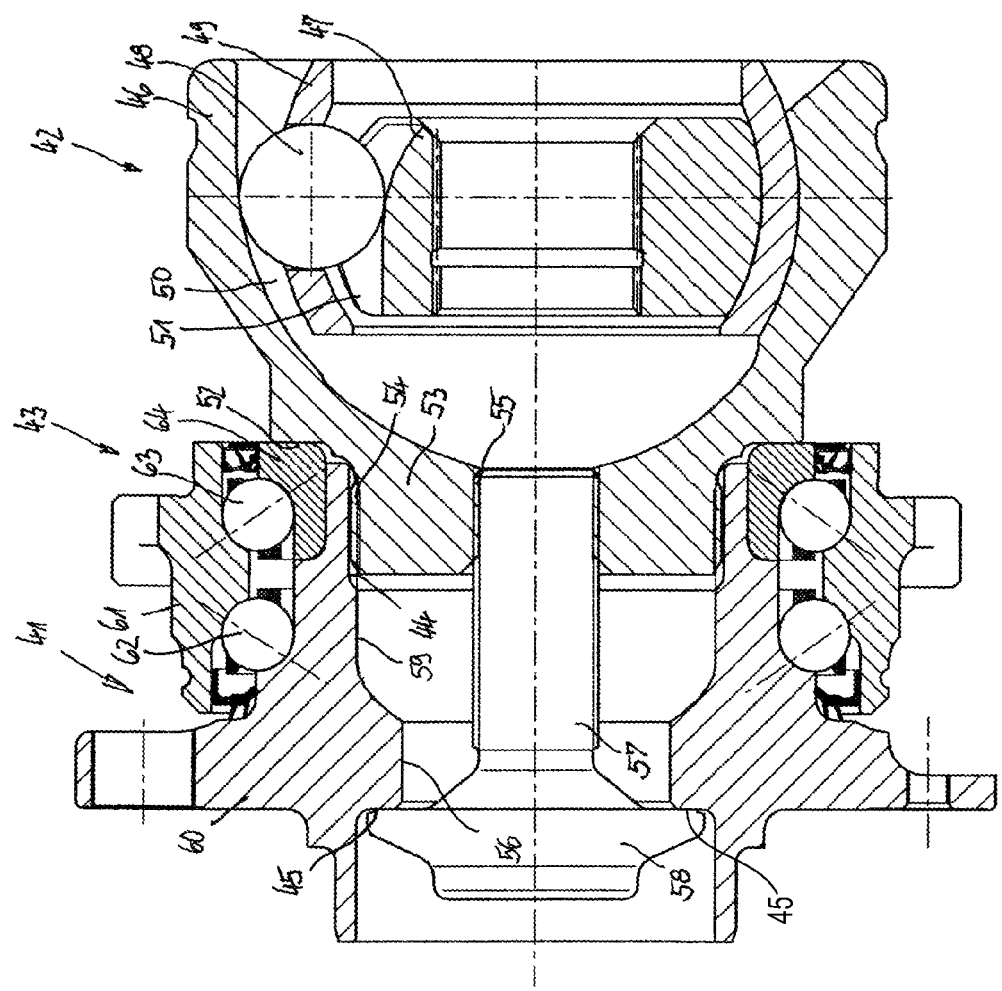
FIG. 3 shows an inventive unit comprising a constant velocity fixed joint, giving general reference numbers.
Figure 4:
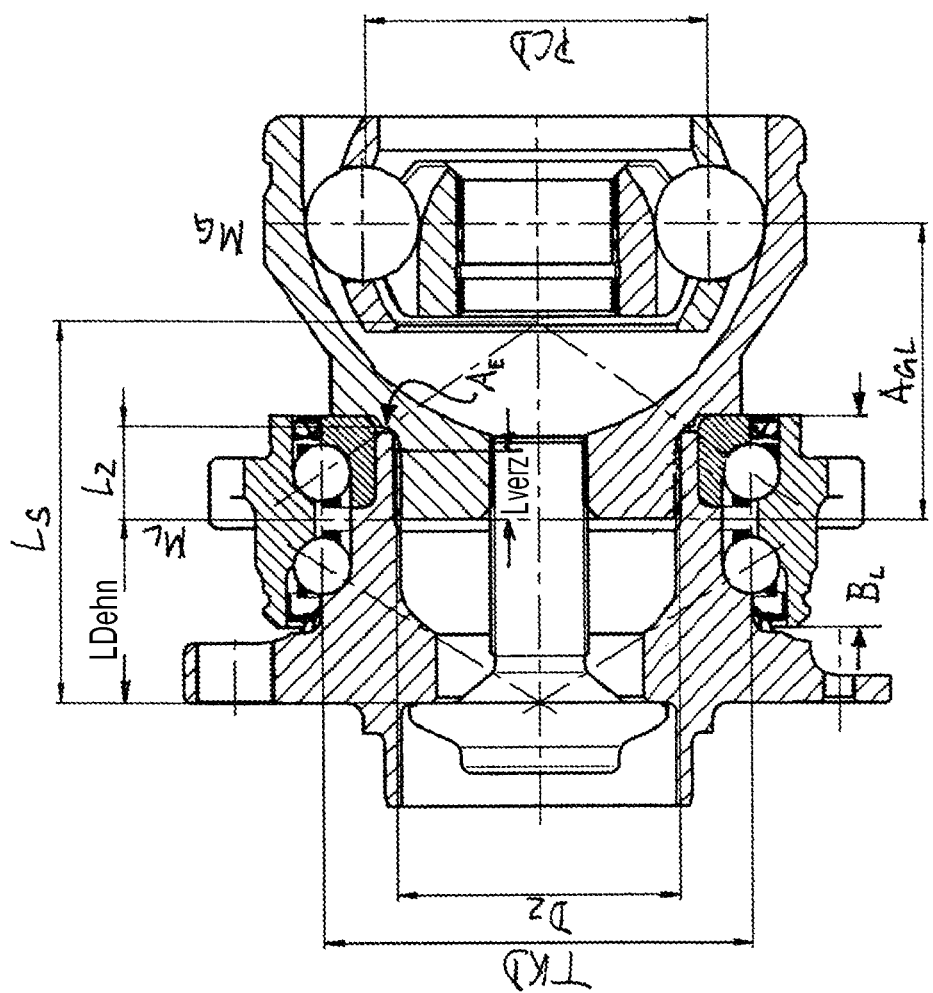
FIG. 4 shows the unit according to FIG. 3, giving characteristic parameters.

FIGS. 3 and 4 each show a wheel hub unit 41 for a driving wheel of a motor vehicle, having a constant velocity fixed joint 42 for being connected to a driveshaft. The wheel hub unit 41 comprises a bearing unit 43 and a wheel hub 60, with the bearing unit 43 being slipped on to the wheel hub 60 and being axially clamped in between the wheel hub 60 and the constant velocity fixed joint 42. The wheel hub 60 comprises a flange for threading on a wheel to which a brake disc can be threaded as well. Furthermore, the wheel hub 60 comprises a through-aperture 59 into which there are formed inner shaft teeth 44 from the joint end. At the flange, there is formed a central, substantially radial supporting face 45. The constant velocity fixed joint 42 is provided in the form of a UF joint (undercut free joint) and comprises an outer joint part 46, an inner joint part 47, torque transmitting balls 48 as well as a ball cage 49. The balls are held and guided in pairs of outer ball tracks 50 in the outer joint part and inner ball tracks 51 in the inner joint part. At the outer joint part 46, at the wheel hub end, there is formed a substantially radial supporting face 52. Furthermore, a central journal 53 is attached to the outer joint part and carries outer shaft teeth 54 which engage inner shaft teeth 44 of the hub. Furthermore, the journal is provided with a continuous central threaded bore 55 into which there is threaded a bolt 57 which, by means of its bolt head 58, is supported on the radial supporting face 45 of the wheel hub 60. The supporting face 45 is provided on a reduced diameter 56 of the through-aperture 59. The double-row bearing 43 comprises an outer bearing race 61 which can be inserted into a wheel carrier and forms outer bearing grooves (no reference numbers) for two rows of bearing balls 62, 63. A first inner bearing groove for the ball row 62 is provided directly in the wheel hub 60, whereas a second ball groove for the second ball row 63 is provided in a separate inner bearing race 64. The inner bearing race 64 axially projects beyond the wheel hub 60, so that the bearing assembly 43, under the influence of the supporting face 52 at the outer joint part 46, can be pretensioned by the bolt 57 supported on the supporting face 45. An inventive joint according to FIGS. 3 and 4 permits a qualitatively larger pitch circle diameter TKD of the bearing assembly, because for clearly reducing the distance $A_{GL}$ between the bearing center $M_L$ and the joint center $M_G$, a definite qualitative increase in the journal diameter $D_Z$ has been effected. Said increase in the journal diameter $D_Z$ permits the journal length $L_Z$ to be shortened. In FIG. 4, too, mention is made of further parameters to which reference is made in the description and the claims respectively, i.e. the pitch circle diameter PCD of the joint, the bearing width $B_L$ as well as the supporting length $L_S$ of the bearing assembly. The elongation length $L_{DEHN}$ of the bolt and the annular cross-sectional face $A_E$ of the wheel hub underneath the separate inner bearing race are referred to. In this case, too, the bearing has an O-configuration with effective lines of the balls which are positioned on symmetric conical faces which are open relative to one another.

As compared to the assembly according to FIGS. 1 and 2 wherein the diameter of the journal is minimized and consequently is relatively rotationally soft, the inventive assembly according to FIGS. 3 and 4 shows a short, thick and thus rotationally stiff journal. The previously occurring micro-movements between the supporting face at the outer joint part and the respective counter face at the separate inner bearing race do not occur in the joint according to the invention.

Figure 5:
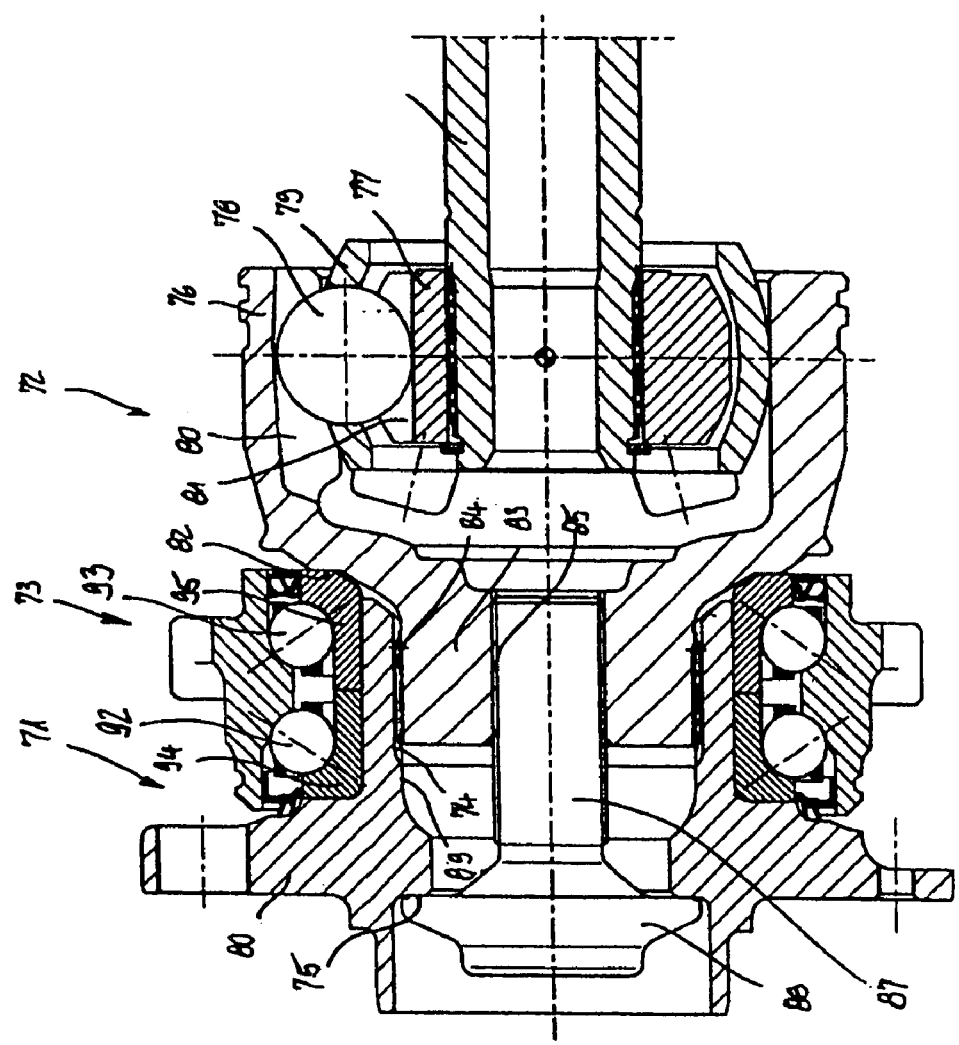
FIG. 5 shows an inventive unit comprising a constant velocity plunging joint, giving general reference numbers.
Figure 6:
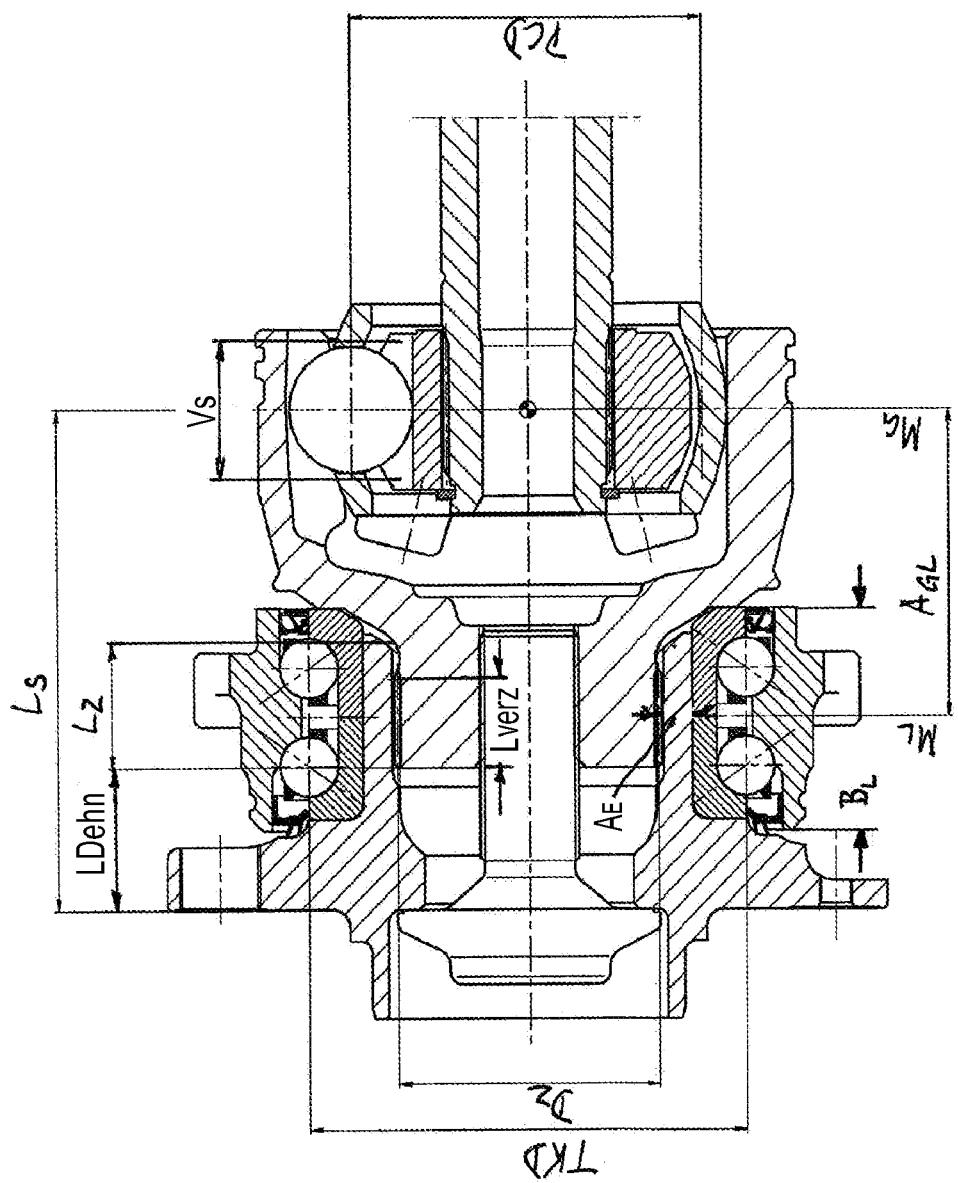
FIG. 6 shows the unit according to FIG. 5, giving characteristic parameters.

FIGS. 5 and 6 show a wheel hub unit 71 for a driving wheel of a motor vehicle, having a constant velocity plunging joint 72 for being connected to a driveshaft, with a bearing unit 73 being slipped on to the wheel hub unit 71 and being axially clamped in between the wheel hub unit 71 and the constant velocity plunging joint 72. The wheel hub 90 comprises a flange for threading on a wheel to which a brake disc can be threaded as well. Furthermore, the wheel hub 90 comprises a through-aperture 89 into which there are formed inner shaft teeth 74 from the joint end. At the flange, there is formed a central, substantially radial supporting face 75. The constant velocity plunging joint 72 is provided in the form of a VL joint (Löbro cross track plunging joint) and comprises an outer joint part 76, an inner joint part 77, torque transmitting balls 78 as well as a ball cage 79. The balls are held and guided in pairs of outer ball tracks 80 in the outer joint part and inner ball tracks 81 in the inner joint part. At the outer joint part 76, at the wheel hub end, there is formed a substantially radial supporting face 82. Furthermore, a central journal 83 is attached to the outer joint part and carries outer shaft teeth 84 which engage inner shaft teeth 74 of the hub. Furthermore, the journal is provided with a continuous central threaded bore 85 into which there is threaded a bolt 87 which, by means of its bolt head 88, is supported on the radial supporting face 75 of the wheel hub 90. The supporting face 75 is provided on a reduced diameter 86 of the through-aperture 89. The double-row bearing 73 comprises an outer bearing race 91 which can be inserted into a wheel carrier and forms outer bearing grooves (no reference numbers) for two rows of bearing balls 92, 93. A first inner bearing groove for the ball row 92 is provided in a bearing race 94, whereas a second ball groove for the second ball row 93 is provided in an inner bearing race 95. The inner bearing race 94 axially projects beyond the wheel hub 90, so that the bearing assembly 73, under the influence of the supporting face 82 at the outer joint part, can be pretensioned by the bolt 87 supported on the supporting face 75. An inventive joint according to FIGS. 5 and 6 permits a qualitatively larger pitch circle diameter TKD of the of the bearing assembly, because for clearly reducing the distance $A_{GL}$ between the bearing center $M_L$ and the joint center $M_G$, a definite qualitative increase in the journal diameter $D_Z$ has been effected. Said increase in the journal diameter $D_Z$ permits the journal length $L_Z$ to be shortened. In FIG. 4, too, mention is made of further parameters to which reference was made in the description and the claims respectively, i.e. the pitch circle diameter PCD of the joint, the bearing width $B_L$ as well as the supporting length $L_S$ of the bearing assembly. The elongation length $L_{DEHN}$ of the bolt and the annular cross-sectional face $A_E$ of the wheel hub underneath the separate inner bearing race are referred to. The joint center $M_G$ is located centrally between the two halves of the plunging distance $V_S/2$ on either side. In this case, too, the bearing has an O-configuration with effective lines of the balls which are positioned on symmetric conical faces.

As compared to the assembly according to FIGS. 1 and 2 wherein the diameter of the journal is minimised and consequently is relatively rotationally soft, the inventive assembly according to FIGS. 5 and 6 shows a short, thick and thus rotationally stiff journal. The previously occurring micro-movements between the supporting face at the outer joint part and the respective counter face at the separate inner bearing race do not occur in the joint according to the invention.

The description of FIGS. 1-6 above provides a new concept for a unit of said type which ensures a higher stiffness and shorter length and which avoids the above-mentioned disadvantages.

In one non-limiting example, half the sum of the pitch circle diameter PCD and of the joint balls in the constant velocity universal joint and the bearing width $B_L$ is greater than the center-to-center distance $A_{GL}$ between the joint center $M_G$ of the constant velocity universal joint, with the joint in the aligned condition, and the geometric center $M_L$ of the wheel bearing such that $(PCD+B_L)/2 > A_{GL}$.

In another example, the ratio of the bearing width $B_L$ and the journal diameter at the bearing base $D_Z$ is smaller than 1. That is, $B_L/D_Z < 1$. In a further example, the ratio of the journal length $L_Z$ and the pitch circle diameter of the bearing balls TKD is smaller than 0.5. That is, $L_Z/TKD < 0.5$.

In yet another example, the ratio of the used teeth length $L_{VERZ}$ and the pitch circle diameter of the bearing balls TKD is smaller than 0.25. That is, $L_{VERZ}/TKD < 0.25$. In a further example, the ratio of the pitch circle diameter of the bearing balls and the bearing width is greater than 1.9. That is, $TKD/B_L > 1.9$.

According to another non-limiting example, the ratio of the center-to-center distance $A_{GL}$ between the constant velocity fixed joint and the wheel bearing on the one hand and the journal diameter at the journal base $D_Z$ on the other hand is smaller than 2. That is, $A_{GL}/D_Z < 2$. More particularly, it is proposed that the ratio of the center-to-center distance between the constant velocity fixed joint and the wheel bearing in the one hand and the journal diameter at the journal basis $D_Z$ on the other hand is smaller than 1.5 and more particularly smaller than 1.2. This results in a journal which is particularly rotationally stiff in order to minimize the relative movements between the inner bearing race and the joint abutment face.

In yet another non-limiting example, the ratio of the pitch circle diameter of the wheel bearing TKD and the journal length $L_Z$ is greater than 2. That is, $TKD/L_Z > 2$. Further, the ratio of the pitch circle diameter of the wheel bearing TKD and the journal length $L_Z$ is greater than 2.25 and more particularly greater than 2.85. In this way, the rotational stiffness of the journal is paired with a tilting stiffness of the wheel bearing in order to minimize in operation the development of noise resulting from the relative movements between the inner bearing race and the joint abutment face, and also to minimize the influence of deformation, more particularly of the wheel hub.

Finally, according to another non-limiting example, the ratio of the center-to-center distance $A_{GL}$ between the constant velocity universal joint and the wheel bearing on the one hand and the journal length $L_Z$ on the other hand is greater than 1.95 and more particularly, the ratio is greater than 2.0.

The invention claimed is:

1. A wheel hub/constant velocity joint assembly, comprising:
   a wheel hub with a through-aperture carrying inner shaft teeth clamped to an outer joint part of a constant velocity joint, the outer joint part comprises a formed-on journal with outer shaft teeth, wherein the inner shaft teeth of the through-aperture and the outer shaft teeth of the journal engage one another; and
   a double-row wheel bearing slid on to the wheel hub which comprises an inner bearing race which directly supports an end face of the outer joint part,
   wherein half the sum of a pitch circle diameter of (PCD) the constant velocity joint and a bearing width ($B_L$) is greater than a center-to-center distance ($A_{GL}$) between the constant velocity joint and the wheel bearing such that $(PCD+B_L)/2>A_{GL}$ is satisfied.

2. An assembly according to claim 1, wherein a ratio of a bearing width ($B_L$) and a journal diameter at a bearing base ($D_Z$) is less than 1.

3. An assembly according to claim 1, wherein a ratio of a journal length ($L_Z$) and a pitch circle diameter of (TKD) the wheel bearing is less than 0.5.

4. An assembly according to claim 1, wherein a ratio of a used teeth length ($L_{VERZ}$) and a pitch circle diameter of (TKD) the wheel bearing is less than 0.25.

5. An assembly according to claim 1, wherein a ratio of a pitch circle diameter of (TKD) the wheel bearing and a bearing width ($B_L$) is greater than 1.9.

6. An assembly according to claim 1, wherein a ratio of a cross-sectional area ($A_E$) of the wheel hub in a region of a separate inner bearing race, and a square of an elongation length ($L_{DEHN}$) of a bolt for connecting the wheel hub and the outer joint part is greater than 0.2 such that $A_E/L_{DEHN}^2>0.2$ is satisfied.

7. An assembly according to claim 1, wherein the wheel bearing comprises one separate inner bearing race only.

8. An assembly according to claim 1, wherein at an axially opposite end relative to the inner shaft teeth, the wheel hub comprises a reduced diameter of the through-aperture.

9. An assembly according to claim 1, wherein the journal comprises a central threaded bore into which there is threaded a bolt for clamping the wheel hub to the outer joint part.

10. An assembly according to claim 9, wherein, in the region of the reduced diameter, the bolt head is supported on a supporting face of the wheel hub.

11. An assembly according to claim 1, wherein the constant velocity joint is a fixed joint wherein a center of the joint ($M_G$) is defined axially by a plane of the ball centers when the joint is in the aligned condition.

12. An assembly according to claim 1, wherein the constant velocity joint is a plunging joint, wherein a center of the joint ($M_G$) is defined axially by a plane of the ball centers when the joint is in the aligned condition and with the joint being set to a center of the axial plunging path ($V_S$).

13. A wheel hub/constant velocity joint assembly, comprising:
   a wheel hub with a through-aperture carrying inner shaft teeth clamped to an outer joint part of a constant velocity fixed joint, which outer joint part comprises a formed-on journal with outer shaft teeth, wherein the inner shaft teeth of the through-aperture and the outer shaft teeth of the journal engage one another; and
   a double-row wheel bearing slid on to the wheel hub which comprises an inner bearing race which directly supports an end face of the outer joint part,
   wherein a ratio of a pitch circle diameter of the wheel bearing (TKD) and a journal length ($L_z$) is greater than 2 such that $TKD/L_z>2$ is satisfied,
   wherein a ratio of a cross-sectional area ($A_E$) of the wheel hub in a region of a separate inner bearing race, and a square of an elongation length ($L_{DEHN}$) of a bolt for connecting the wheel hub and the outer joint part is greater than 0.2.

14. An assembly according to claim 13, wherein the ratio of the pitch circle diameter of the wheel bearing (TKD) and the journal length ($L_Z$) is greater than 2.85 such that $TKD/L_Z>2.85$ is satisfied.

* * * * *